(12) United States Patent
Harley et al.

(10) Patent No.: US 7,720,620 B2
(45) Date of Patent: May 18, 2010

(54) SYSTEM AND METHOD FOR DETERMINING HARMONIC CONTRIBUTIONS FROM NON-LINEAR LOADS WITHOUT DISCONNECTING ANY LOAD

(75) Inventors: Ronald Gordon Harley, Lawrenceville, GA (US); Deepakraj M. Divan, Marietta, GA (US); Franklin Cook Lambert, Palmetto, GA (US); Joy Mazumdar, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 117 days.

(21) Appl. No.: 11/337,630

(22) Filed: Jan. 23, 2006

(65) Prior Publication Data

US 2006/0173640 A1    Aug. 3, 2006

Related U.S. Application Data

(63) Continuation-in-part of application No. 10/940,101, filed on Sep. 14, 2004, now Pat. No. 7,013,227.

(60) Provisional application No. 60/503,003, filed on Sep. 15, 2003.

(51) Int. Cl.
*G01R 21/00* (2006.01)
*G06F 13/00* (2006.01)

(52) U.S. Cl. .................. 702/60; 702/181; 702/182; 702/188

(58) Field of Classification Search .............. 702/57–62, 702/64, 65, 124, 126, 187, 188, 189; 700/44; 340/657, 658; 324/623; 706/39
See application file for complete search history.

(56) References Cited

U.S. PATENT DOCUMENTS

| | | | |
|---|---|---|---|
| 5,063,601 A * | 11/1991 | Hayduk | 706/39 |
| 5,508,623 A | 4/1996 | Heydt et al. | 342/623 |
| 5,539,651 A | 7/1996 | Zabar et al. | 702/60 |
| 5,754,440 A | 5/1998 | Cox et al. | 702/72 |
| 6,215,316 B1 | 4/2001 | Zu | 324/623 |
| 6,590,362 B2 | 7/2003 | Parlos et al. | 318/799 |
| 6,667,692 B2 | 12/2003 | Griffin | 340/658 |
| 6,713,978 B2 | 3/2004 | Parlos et al. | 318/268 |
| 2003/0014200 A1 * | 1/2003 | Jonker et al. | 702/60 |
| 2005/0171647 A1 | 8/2005 | Kunsman et al. | 700/293 |

OTHER PUBLICATIONS

El-Amin et al., "Artificial Neural Network for Power Systems Harmonic Estimation", IEEE, Mar. 1998, pp. 999-1009.*

(Continued)

*Primary Examiner*—Eliseo Ramos Feliciano
*Assistant Examiner*—Phuong Huynh
(74) *Attorney, Agent, or Firm*—Thomas, Kayden, Horstemeyer & Risley, LLP

(57) ABSTRACT

A system and method for determining non-linear load harmonics impact on the voltage distortion at the point of common coupling is disclosed. Briefly described, one embodiment is a method comprising metering voltage on an electric power system; metering current on the electric power system; determining a predicted voltage based upon the metered current; comparing the predicted voltage with the metered voltage; and determining a harmonic voltage component using a plurality of weights determined when the predicted voltage converges with the metered voltage.

21 Claims, 10 Drawing Sheets

OTHER PUBLICATIONS

Zrida et al., "An On'Line Neural Network-Based Hamonic Analyzer", IEEE, May 1995, pp. 622-625.

Dash et al., "Harmonic Estimation in a Power System Using Adaptive Perceptions", IEEE, Nov. 1996, pp. 999-1009.

El-Amin, et al., "Artificial Neural Networks for Power Systems Harmonic Estimation", IEEE, Mar. 1998, pp. 999-1009.

Mori, et al., "An Artificial Neural-Net Based Method for Predicting Power System Voltage Harmonics," IEEE, Jan. 1992, pp. 402-409.

Wijayakulasooriya, et al., "Fast Non-Recursive Extraction of Individual Harmonics Using Artificial Neural Networks", IEEE, 2005.

Burton, et al., "Implementation of a Neural Network to Adaptively Identify and Control VSI-Fed Induction Motor Stator Currents", IEEE, 1998.

Venayagamoorthy, et al., "Two Separate Continually Online-trained Neurocontrollers for Excitation and Turbine Control of a Turbogenerator", IEEE, 2002.

\* cited by examiner

SYSTEM AND METHOD FOR DETERMINING HARMONIC CONTRIBUTIONS FROM NON-LINEAR LOADS WITHOUT DISCONNECTING ANY LOAD

CROSS REFERENCE TO RELATED APPLICATION

This application is a continuation-in-pad of U.S. utility application entitled "System and Method for Determining Harmonic Contributions from Non-Linear Load," assigned Ser. No. 10/940,101, filed Sep. 14, 2004, now issued as U.S. Pat. No. 7,013,227, which claimed the benefit of U.S. provisional application entitled, "Method to Discriminate Between the Contributions of the Customer and the Power System to the Harmonic Disturbance," assigned Ser. No. 60/503,003, filed Sep. 15, 2003, both of which are entirely incorporated herein by reference.

TECHNICAL FIELD

Various embodiments are generally related to electric power supply systems and, more particularly, are related to systems and methods for identifying power system harmonics using an artificial neural network.

BACKGROUND

In electrical power supply networks, harmonics is a term used to describe the shape or characteristic of a distorted non-sinusoidal voltage or current waveform with respect to the fundamental frequency sine wave. Harmonic currents generated by non-linear loads, such as power electronic equipment, arc furnaces, saturating inductances, and other types of solid-state load devices, are injected into an electric power supply network. Such injected harmonic currents distort the supply source in an undesirable manner. These harmonic currents are sometimes referred to as contributions from the customer.

Harmonic currents cause harmonic voltage drops when harmonic currents generated by the customer's non-linear loads are injected into the electric power supply network. Accordingly, the supply voltage at the customer is no longer sinusoidal. Harmonic currents that distort the sinusoidal supply voltage (and/or supply current) in an electric power supply network give rise to several problems, such as: creating distorted supply voltages to loads, which in some cases cause overheating of customer equipment, or additional losses and overheating of network equipment, creating additional losses in transformers and/or cables, inducing electromagnetic interference onto neighboring telecommunication circuits, creating light flicker, causing malfunctioning of metering, current and/or voltage transducers, and/or causing malfunctioning of protection systems.

The resultant distorted load current, when measured or metered at the connection point of the customer to the electric power supply network, consists of two components; that due to contributions from the customer's non-linear load, and that due to contributions from the power system. Accordingly, it is desirable to distinguish between these two components, particularly without disconnecting the customer from the network to perform conventional load testing or analysis.

Other customers may be connected to the same connection point, or relatively close to the connection point, of the customer having loads that generate undesirable harmonic currents. Since these harmonic currents are injected into the electric power supply network, the supply voltage (and/or current) provided to the other customers may be distorted by the customer having the non-linear loads (that do cause harmonics). Accordingly, these other customers may not receive an acceptable level of power quality from the electric power supply network, thereby degrading performance of their load devices.

These other customers may have linear loads (that do not cause harmonics) and/or non-linear loads (that do cause harmonics). In some situations, the non-linear loads of the other customer, by themselves, would not otherwise cause significant unacceptable distortions in the supply voltage. However, the distortions from both customers may have a cumulative effect on the total harmonic distortion in the supply voltage. Accordingly, it is desirable to distinguish between harmonic distortion contributions from a plurality of customers supplied from the electric power supply network.

Furthermore, traditional testing methods provide results that are problematic at best. That is, since the non-linear loads may be on or off at the time of testing, it is problematic whether or not testing results accurately reflect harmonics of interest. For example, if the test is conducted during the day, harmonics induced by solid-state lighting ballasts may or may not be on at the time of testing. In a large plant, determining when a particular solid-state controlled motor is operating requires coordination. If many solid-state controlled motors are in the plant, coordination becomes even more difficult. Furthermore, even if all of the solid-state controlled motors could be simultaneously operating during the test, or if testing results of individual motors could be computationally aggregated, is the resultant harmonic contribution from all of the solid-state controlled motors a reasonable representation of actual operating conditions of the plant? Accordingly, it is desirable to be able to test for harmonic contributions on an ongoing basis, and to differentiate harmonic contributions from individual customers when multiple customers are connected at a common connection point (or relatively close together).

SUMMARY

A system and method for determining harmonics caused by non-linear loads are disclosed. Briefly described, one embodiment is a method comprising metering voltage on an electric power system; metering current on the electric power system; determining a predicted current based upon the metered voltage; comparing the predicted current with the metered current; and determining a harmonic current component using a plurality of weights determined when the predicted current converges with the metered current.

Another embodiment is a system comprising an artificial neural network configured to receive information corresponding to metered voltage, to train itself such that a predicted current is determined which converges with a metered current, and to determine a harmonic current component using a plurality of weights determined when the predicted current converges with the metered current; and a processor configured to execute the artificial neural network.

Another embodiment is an artificial neural network that determines harmonics caused by non-linear loads, comprising a training artificial neural network that determines a predicted current from a metered voltage, and that determines a plurality of weights when the predicted current converges with a metered current; and an estimating artificial neural network that determines a harmonic current component using the determined weights received from the training artificial neural network.

Another embodiment is a method comprising metering voltage on an electric power system; metering current on the electric power system; determining a predicted voltage based upon the metered current; comparing the predicted voltage with the metered voltage; and determining a harmonic voltage component using a plurality of weights determined when the predicted voltage converges with the metered voltage.

Another embodiment is a system comprising an artificial neural network configured to receive information corresponding to metered current, to train itself such that a predicted voltage is determined which converges with a metered voltage, and to determine a harmonic voltage component using a plurality of weights determined when the predicted voltage converges with the metered voltage; and a processor configured to execute the artificial neural network.

Another embodiment is an artificial neural network that determines harmonics caused by non-linear loads, comprising a training artificial neural network that determines a predicted voltage from a metered current, and that determines a plurality of weights when the predicted voltage converges with a metered voltage; and an estimating artificial neural network that determines a harmonic voltage component using the determined weights received from the training artificial neural network.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
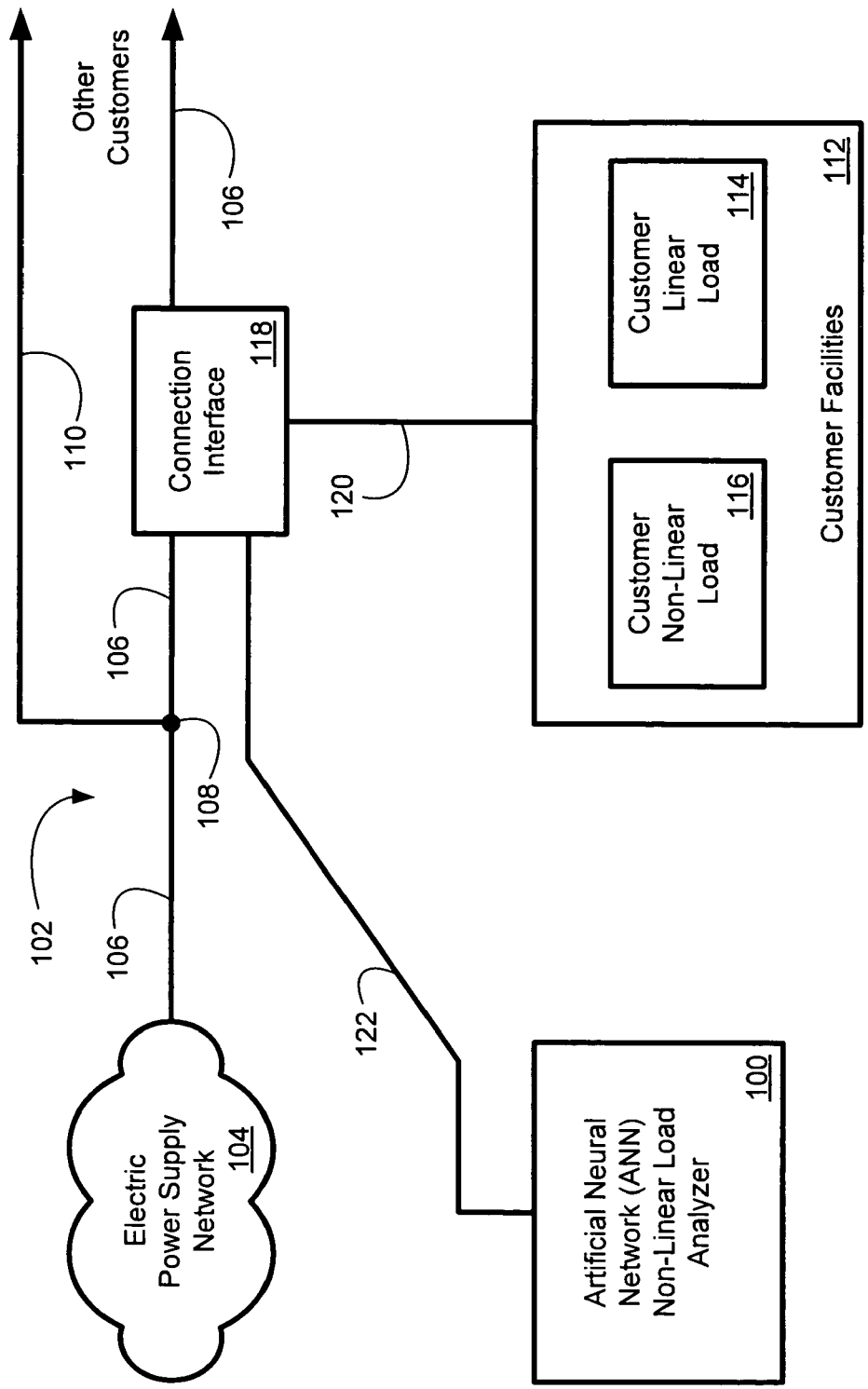
FIG. 1 is a block diagram illustrating an embodiment of the artificial neural network (ANN) non-linear load analyzer coupled to a simplified single-line diagram of an electric power supply network.

The artificial neural network (ANN) non-linear load analyzer 100 provides a system and method for determining harmonic contributions from non-linear loads. FIG. 1 is a block diagram illustrating an embodiment of the ANN non-linear load analyzer 100 coupled to a simplified single-line diagram of a portion an electric power supply service system 102. Service system 102 is ultimately coupled to, and power supplied from, the electric power supply system 104. Service system 102 may represent either a single-phase or a three-phase system. Furthermore, the operating voltage of service system 102 may range from customer service voltage, to a distribution voltage, up through EHV (extra high voltage). Also, service system 102 may be radial or part of a network.

Typically, electric power supply network 104 provides service to customers via a conductor 106. Often, the service provider provides service to multiple customers over a common component, illustrated here as conductor 106. In some cases, a tap 108 on conductor 106 provides coupling to a second conductor 110, which then extends to the other customer(s). Or, the customer facilities 112 of interest, having the linear load 114 and the non-linear load 116, may tap off from the conductor 106 at the connection interface 118. Here, conductor 120 is illustrated as providing service from the connection interface 118 to the customer facilities 112.

It is appreciated that the above-described service system 102 is a very simplified diagram of an exemplary service system. Other service systems may provide service using transformers (not shown), or provide service directly from a substation bus bar (not shown). Service voltages may vary from one service system to another, or may be of the same voltage. Also, voltages along a service system may vary if transformers are employed to alter voltages. As noted above, service system 102 may represent either a single-phase and/or a three-phase system. For example, but not limited to, conductor 106 could be a three-phase conductor network and the service provided to the customer facilities 112 could be single-phase.

Many service variations are possible which may be analyzed for harmonics by embodiments of the ANN non-linear load analyzer 100. Accordingly, the ANN non-linear load analyzer 100 may be configured to couple to single-phase, two phase and/or three-phase systems; may be configured to couple to various system voltages; and may even be configured to couple to power supply systems of different operating frequencies (such as, but not limited to, the 60 hertz system commonly employed in the United States, or the 50 hertz system commonly employed in European systems).

Embodiments of the ANN non-linear load analyzer 100 are configured to conveniently couple to a service system 102, and/or the customer facilities 112, such that data may be collected to determine harmonic components caused by a customer's non-linear load 116. In FIG. 1, a simplified connector 122 illustrates the ANN non-linear load analyzer 100 coupled to the connection interface 118 that provides service to the customer tapped off of conductor 106 in this simplified example. Greater detail of the various connection aspects of the ANN non-linear load analyzer 100 are provided below. However, it is appreciated that the ANN non-linear load analyzer 100 could couple to an electric power system at any suitable point, even directly to the customer's non-linear load 116.

It is appreciated that the ANN non-linear load analyzer 100 determines harmonic contributions from non-linear loads downstream from the connection interface 118. More particularly, the ANN non-linear load analyzer 100 determines harmonic contributions from non-linear loads downstream from the current transformer 204 (FIG. 2) which provides the metered current information, described in greater detail hereinbelow. Accordingly, depending upon how the ANN non-linear load analyzer 100 is connected to the service system 102, loading from one or more customers may be aggregated. For example, in a situation where a customer is billed for harmonic components that the customer injects into the service system 102, the connection interface 118 may be configured to provide metered voltage and current applicable to that specific customer. In another situation, the ANN non-linear load analyzer 100 might be coupled to a convenient location on service system 102, such as at a distribution substation, which serves more than one customer.

Figure 2:
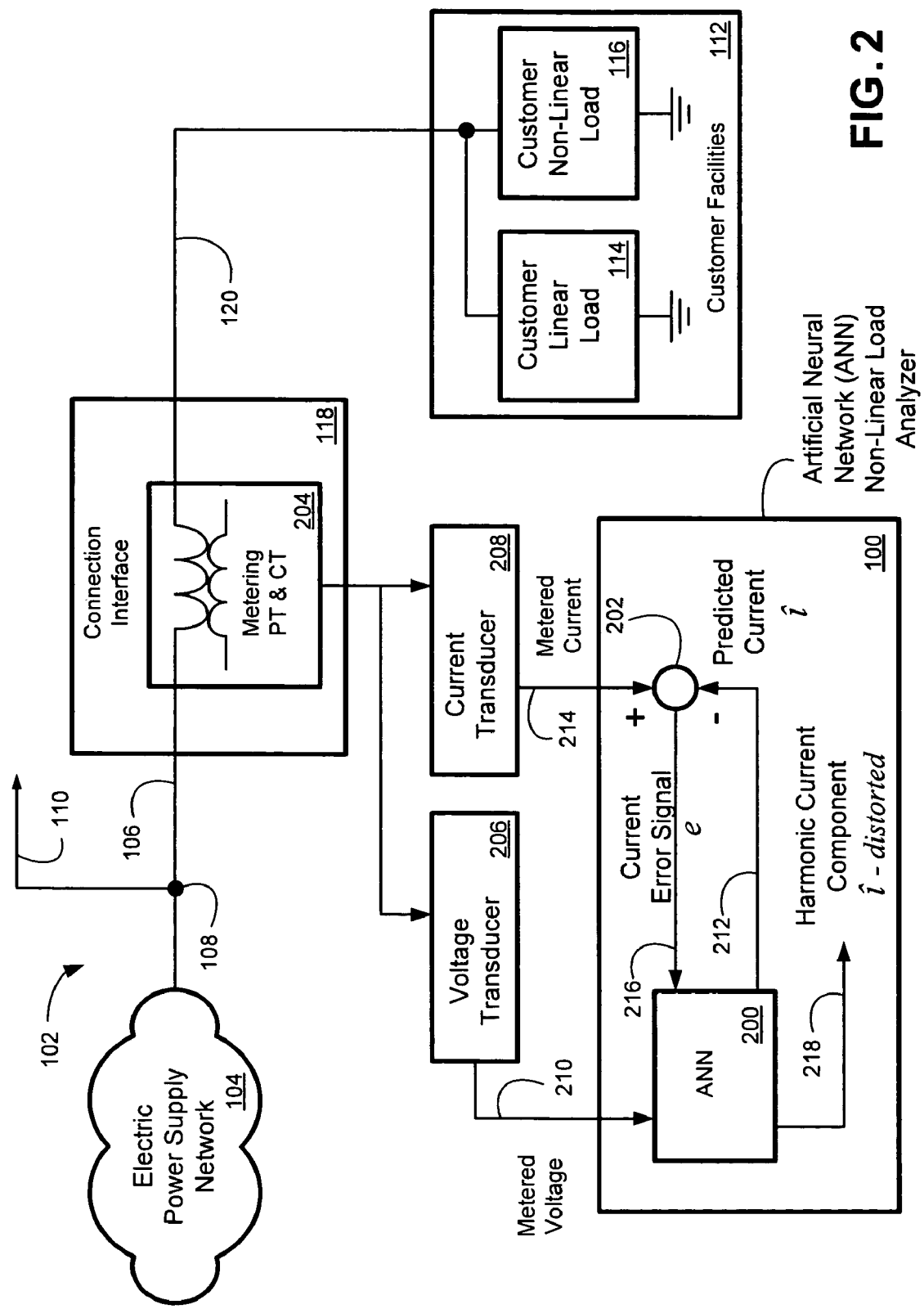
FIG. 2 is a block diagram illustrating in greater detail an embodiment of the ANN non-linear load analyzer coupled to the simplified single-line diagram of the electric power supply network.

FIG. 2 is a block diagram illustrating in greater detail an embodiment of the ANN non-linear load analyzer 100 coupled to the simplified single-line diagram of the electric power supply network 104. The ANN non-linear load analyzer 100 includes an artificial neural network (ANN) 200 and summing circuit 202.

A metering potential transformer (PT) and a metering current transformer (CT) 204 are illustrated as residing at the connection interface 118. The PT provides a voltage transformation such that voltage of conductor 106 may be sensed and communicated to voltage transducer 206. The CT provides a current transformation such that current of connection 106 may be sensed and communicated to current transducer 208. Other voltage and/or current sensing devices may alternatively meter voltage and current, respectively.

Voltage transducer 206 converts the sensed alternating current (AC) voltage into a signal, such as a digitally sampled signal, that is proportional to the sensed AC voltage from the PT. Sensed voltages may be phase-to-phase voltages or phase-to-neutral voltages. Current transducer 208 converts the sensed AC current into a signal, such as a digitally sampled signal, that is proportional to the sensed AC current from the CT.

Typically, PTs and CTs are available at various points along the electric power system when various other functions associated with operation of the electric power system are performed. For example, a metering PT and a metering CT may be provided for revenue billing. Or, a PT and/or CT may be for protective devices, auxiliary power and/or communication devices. When such PTs and/or CTs 204 are readily available, the associated voltage transducer 206 and/or current transducer 208 may be coupled to those devices. Thus, information corresponding to the voltage and information corresponding to the current may be available from already-available devices for some embodiments of the ANN non-linear load analyzer 100. In other situations PTs, CTs, voltage transducers 206 and/or the current transducers 208 may not be available. Accordingly, other embodiments of the ANN non-linear load analyzer 100 may be equipped with such devices, or such devices may be separately installed for the ANN non-linear load analyzer 100.

As illustrated in FIG. 2, the ANN 200 receives a signal corresponding to metered voltage, via connection 210. The ANN 200 is configured to output a predicted current $\hat{\imath}$, via the logical connection 212 (since the predicted current $\hat{\imath}$ is computationally determined by executing software, the ANN logic 408 illustrated in FIG. 4, connection 212 is not a physical connection). The predicted current $\hat{\imath}$ is input into the summing circuit 202 such that the predicted current $\hat{\imath}$ is summed with the signal corresponding to metered current, provided on connection 214, such that a difference between the predicted current $\hat{\imath}$ and the metered current is determined. The output of the summing circuit 202 (the difference between the predicted current $\hat{\imath}$ and the metered current) is the current error signal, e, output on the logical connection 216. The current error signal e is returned to the ANN 200.

As the current error signal e approaches zero, or converges to within a predefined threshold, it is appreciated that the ANN 200 has completed training with respect to predicting current. That is, the ANN 200 is accurately predicting current metered at connection interface 118, within some predefined threshold.

When predicted current $\hat{\imath}$ is accurately predicted, the ANN 200 may then computationally determine the harmonic current component, $\hat{\imath}$—distorted. Information corresponding to the harmonic current component, $\hat{\imath}$—distorted, is output on connection 218, and may be used for a variety of purposes, as is well understood in the arts.

Figure 3:
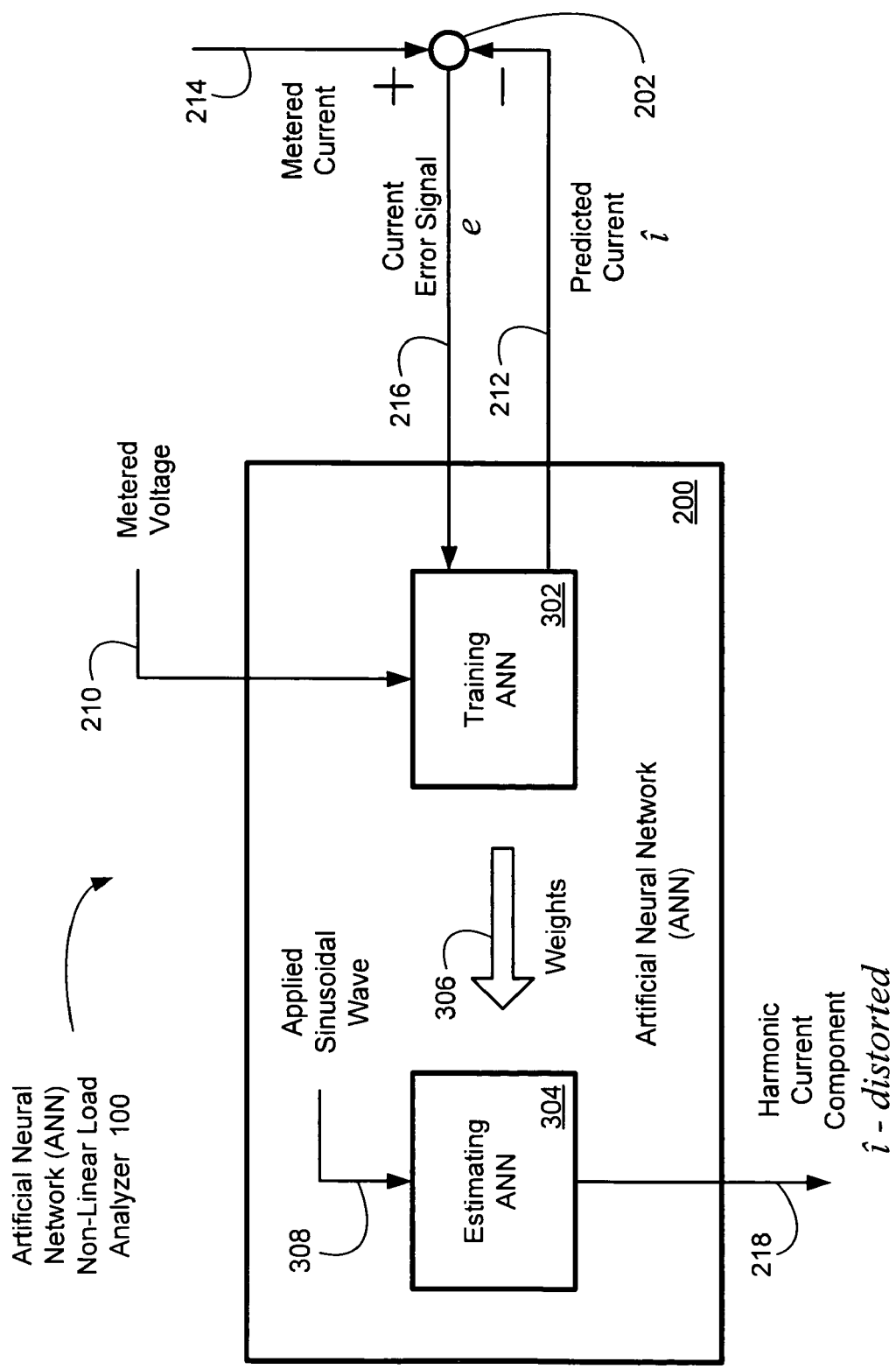
FIG. 3 is a conceptual block diagram illustrating an embodiment of the ANN non-linear load analyzer.

FIG. 3 is a conceptual block diagram illustrating an embodiment of the ANN non-linear load analyzer 100. The ANN 200 (see also FIG. 2), in this embodiment, includes two artificial neural networks, the training ANN 302 and the estimating ANN 304. It is appreciated that the training ANN 302, the estimating ANN 304 and the summing circuit 202 may be implemented as software, firmware, or combinations of software and firmware.

In this conceptual embodiment, the training ANN 302 receives the signal corresponding to metered voltage, via connection 210. At the end of a training time, or sampling interval, the training ANN 302 outputs the predicted current $\hat{\imath}$, via connection 212, to the summing circuit 202. Metered current is then summed with the predicted current $\hat{\imath}$ (such that a difference between the predicted current $\hat{\imath}$ and the metered current is determined). In one embodiment, the metered current at the end of the sampling interval is used for the comparison. (In other embodiments, the metered current used for training may be used when this information is stored for later retrieval.)

The current error signal e is returned on connection 216 to the training ANN 302. As noted above, when the current error signal e approaches zero, or converges, the training ANN 302 has completed training with respect to predicting current. In some embodiments, the current error signal e has converged when the difference between the predicted current $\hat{\imath}$ and the metered current is less than and/or equal to a predefined threshold.

The metered current may be considered as a pure sinusoidal wave provided by the electric power supply network 104 with harmonic components injected thereon by the customer non-linear load 116 (FIGS. 1 and 2). Thus, the corresponding predicted current $\hat{\imath}$ is a computed sinusoidal wave current distorted by the harmonics. The computed predicted current $\hat{\imath}$ may be represented by any suitable mathematical equation or algorithm, which is selected based upon the design of the particular embodiment of the ANN non-linear load analyzer 100.

In one embodiment, the load admittance is calculated. Accordingly, the load admittance is modeled by a suitable equation with determined weights. In another embodiment, weights associated with the equation defining the predicted current $\hat{\imath}$ are determined. After the weights have been determined by the training ANN 302, the weights are communicated to the estimating ANN 304 (represented conceptually by the directional arrow 306).

While the estimating ANN 304 determines the harmonic current component ($\hat{\imath}$—distorted), the training ANN 302 in one embodiment continues sampling. Weights are adjusted at each sample depending on the degree of convergence (the difference between the predicted current $\hat{\imath}$ and the metered current). When the estimating ANN 304 has determined the harmonic current component ($\hat{\imath}$—distorted), the estimating ANN 304 receives another set of weights from the training ANN 302. In one embodiment, the received second set of weights are the most current value of the weights determined by the training ANN 302. Then, the estimating ANN 304 determines another harmonic current component based upon the new weights. The above-described process may be continuously repeated.

Depending upon the embodiment, the training ANN 304 may then restart the training process to predict another predicted current î. Thus, after some period of time, weights associated with the subsequent predicted current î are determined. The newly determined weights may or may not equal the previously determined weights, depending upon whether the nature of the customer's non-linear load 116 and/or the power supply have changed by the time the second training period has been completed. That is, if the degree of convergence has changed since the previous sampling period, newly computed weights will be different. For example, a customer may have turned on (or off) a solid-state load, thereby changing the nature of the customer's non-linear load 116, thereby resulting in a change in the degree of convergence. Accordingly, the training and determining harmonic components may be performed on a continual basis.

The estimating ANN 304 receives the determined weights (for the load admittance and/or predicted current î equation). The estimating ANN 304 then computationally applies the weights to a pure sinusoidal wave 308. Distortion in the output of the sinusoidal wave (distorted by the determined weights) is then used to determine the harmonic current component (î—distorted) associated with the customer non-linear load 116.

Information corresponding to the harmonic current component (î—distorted) and/or a determined load admittance associated with the customer non-linear load 116 may then be communicated onto connection 218, and may be used for a variety of purposes, as is well understood in the arts.

Figure 4:
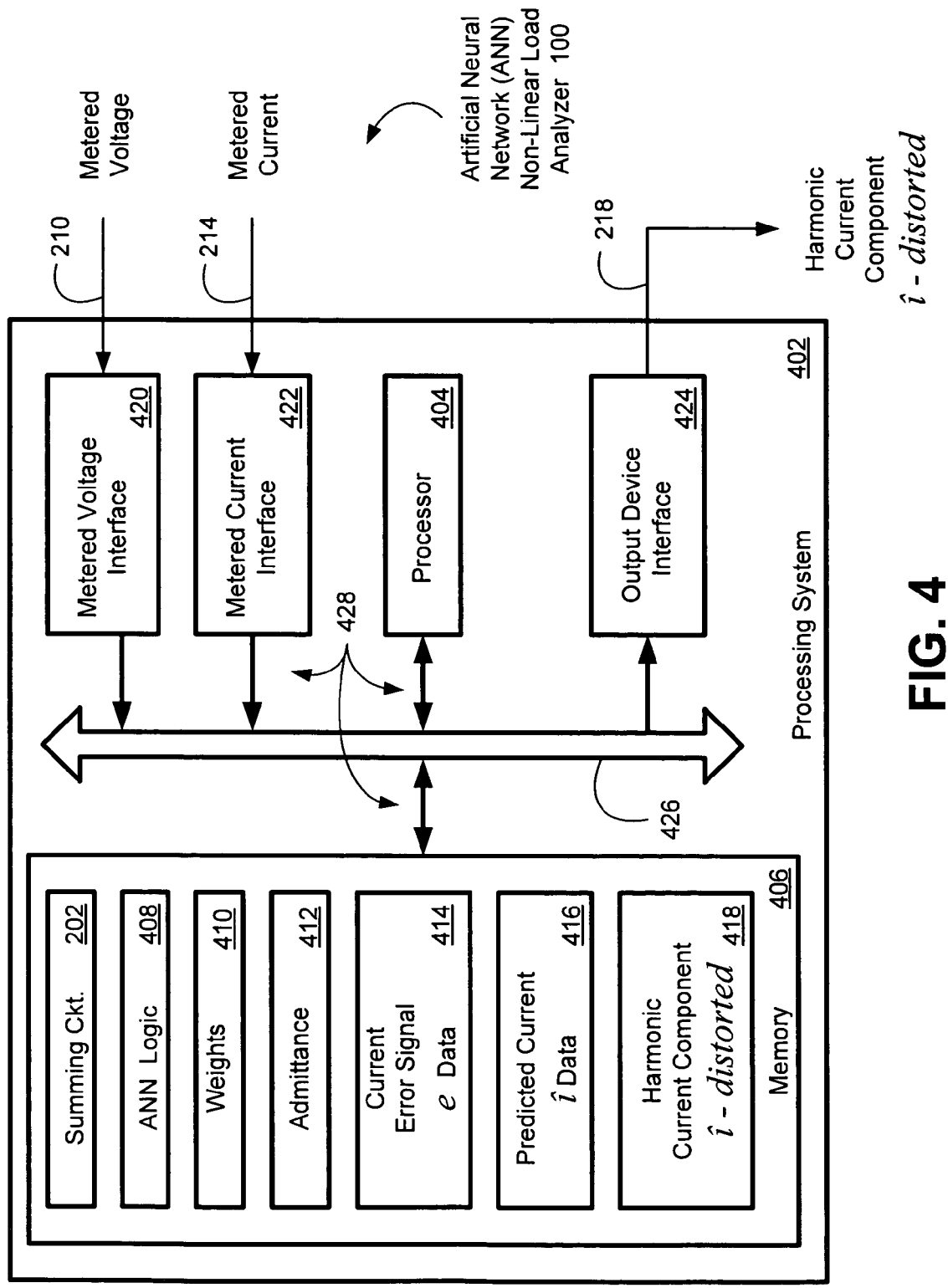
FIG. 4 is a block diagram illustrating in greater detail an exemplary embodiment of an ANN non-linear load analyzer.

FIG. 4 is a block diagram illustrating in greater detail an exemplary embodiment of an ANN non-linear load analyzer 100. The exemplary embodiment comprises a processing system 402 and summing circuit 202. Processing system 402 includes a processor 404 and memory 406. In one embodiment, memory 406 includes regions for storing the summing circuit 202 (implemented as logic), artificial neural network (ANN) logic 408, the above-described weights 410 and admittance 412, data corresponding to the current error signal e 414, the predicted current î 416, and/or the harmonic current component (î—distorted) 418, depending upon the particular embodiment. The information is saved into memory 406 for ongoing processing, and/or may be saved for later processing and/or analysis. In other embodiments, the information may be saved in other memories as needed, such as buffers or random access memories.

Also included are suitable interfaces that provide coupling to the above-described connections which communicate the various information. The metered voltage interface 420 provides coupling to connection 210 such that information corresponding to the metered voltage is received. The metered current interface 422 provides coupling to connection 214 such that information corresponding to the metered current is received. The output device interface 424 provides coupling to connection 218 such that information corresponding to the harmonic current component (î—distorted) is transmitted to a suitable device.

The above described components are communicatively coupled to each other via bus 426 and connections 428. In alternative embodiments of processing system 402, the above-described components are connectivley coupled to processor 404 in a different manner than illustrated in FIG. 4. For example, one or more of the above-described components may be directly coupled to processor 404 or may be coupled to processor 404 via intermediary components (not shown).

The above-described interfaces 420, 422 and/or 424 may be passive devices, or they may be active devices that process the received/transmitted signals into a suitable format. For example, the metered voltage interface 420 may be a simple coupling to connection 210 when the voltage transducer 206 (FIG. 2) provides a suitable metered voltage signal that may be directly communicated onto bus 428 such that information corresponding to metered voltage is received by processor 404. In another embodiment, the metered voltage interface 420 processes the metered voltage information received on connection 210 into a suitable signal that is directly communicated onto bus 428. As another example, the output device interface 426 may communicate information corresponding to the harmonic current component (î—distorted) to a display such that a voltage or current signal is displayed to a viewer. Or, output device interface 426 may communicate information corresponding to the harmonic current component (î—distorted) to another processing system or memory for future analysis.

In various embodiments, the summing circuit 202 could be implemented as software (with its own processor and memory, not shown), as firmware, or as a combination of firmware and software. In another embodiment, an interface (not shown) to receive the metered current information on connection 214 is included such that the processor 404 computationally determines the current error signal e. In this embodiment, the interfaces 422 and 424 are omitted.

Figure 5:
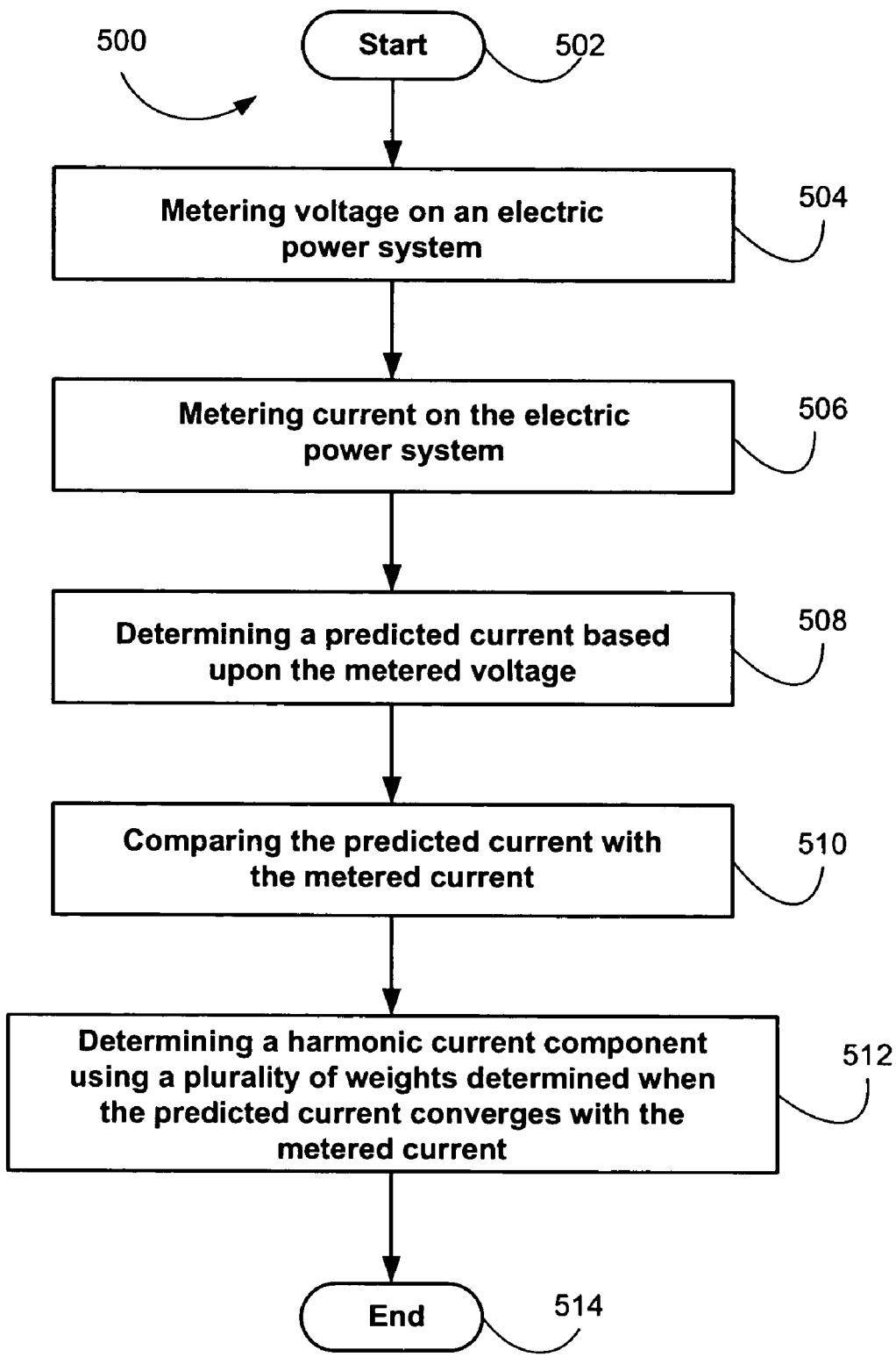
FIG. 5 is a flowchart illustrating an embodiment of a process for determining harmonic components using an embodiment of the ANN non-linear load analyzer.

FIG. 5 shows a flow chart 500 illustrating a process used by an embodiment of ANN non-linear load analyzer 100 (FIGS. 1-4). The flow chart 500 of FIG. 5 shows the architecture, functionality, and operation of an embodiment for implementing the ANN logic 408 (FIG. 4). An alternative embodiment implements the logic of flow chart 500 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 5, or may include additional functions. For example, two blocks shown in succession in FIG. 5 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 502. At block 504, voltage on an electric power system is metered. At block 506, current on the electric power system is metered. At block 508, a predicted current based upon the metered voltage is determined. At block 510, the predicted current is compared with the metered current. At block 512, a harmonic current component is determined using at least one weight determined when the predicted current converges with the metered current. The process ends at block 514.

Figure 6:
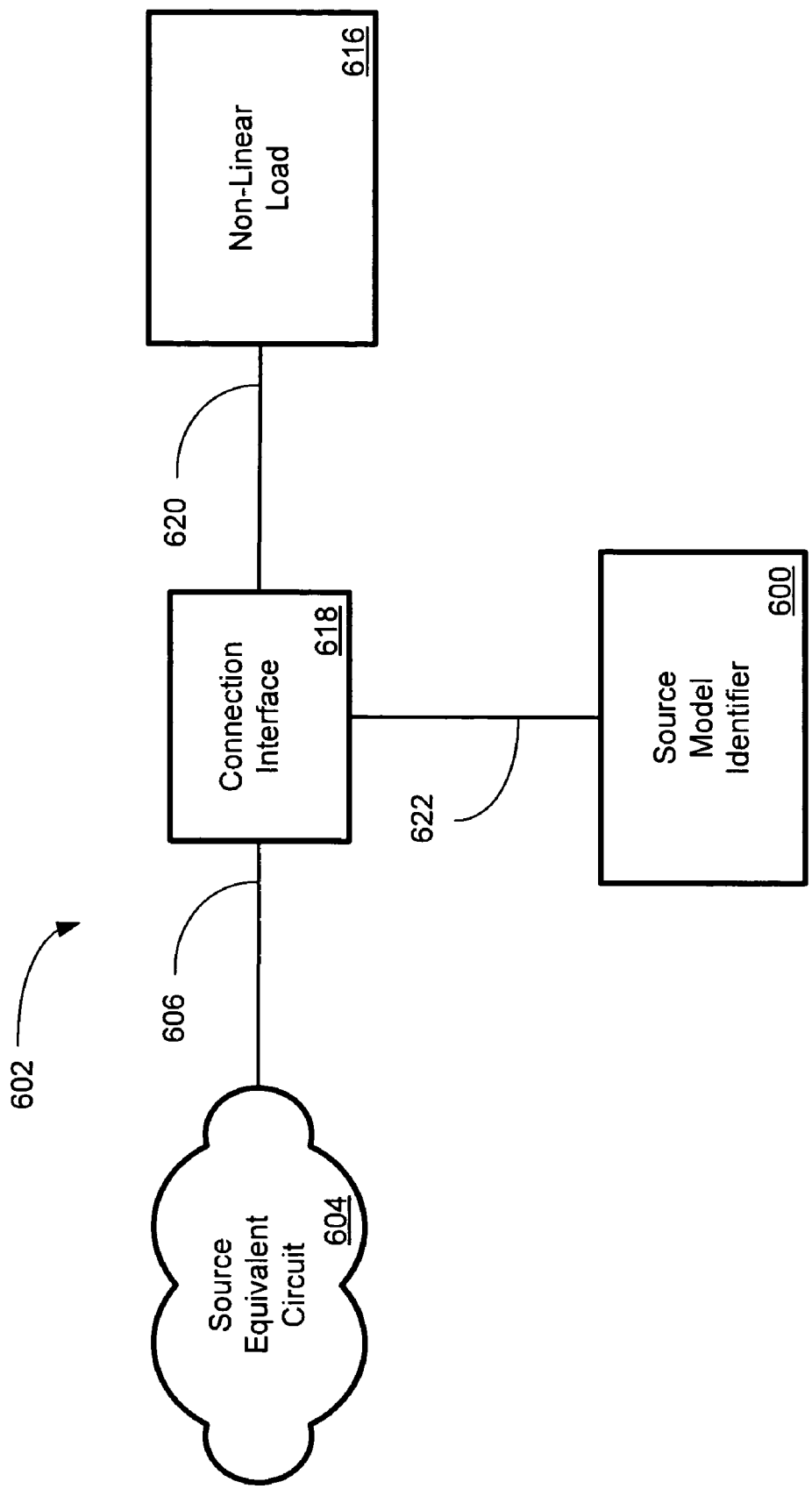
FIG. 6 is a block diagram illustrating an embodiment of an ANN source model identifier coupled to a simplified single line diagram of a source equivalent circuit.

An alternative embodiment of the ANN non-linear load analyzer 100 may be configured as an ANN source model identifier 600. FIG. 6 is a block diagram illustrating an embodiment of the ANN source model identifier 600 coupled to a simplified portion of an electric power supply service system 602. Service system 602 is ultimately coupled to a source equivalent circuit 604. Source equivalent circuit 604 may comprise an electric power supply network together with multiple loads (which could be linear or non-linear). Service system 602 may represent either a single-phase or a three-phase system. Furthermore, the operating voltage of service system 602 may range from customer service voltage, to a distribution voltage, up through EHV. Also, service system 602 may be radial or part of a network.

Typically, service is provided from an electric power supply network, as part of the source equivalent circuit 604, through a conductor 606 to a non-linear load 616. Often, service is provided to multiple customers over a common component, illustrated here as conductor 606. A non-linear load 616 may tap off from the conductor 606 at the connection interface 618. Here, conductor 620 is illustrated as providing service from the connection interface 618 to non-linear load 616.

It is appreciated that the above-described service system 602 is a very simplified diagram of an exemplary service system. Other service systems may provide service using transformers (not shown), or provide service directly from a substation bus bar (not shown). Service voltages may vary from one service system to another, or may be of the same voltage. Also, voltages along a service system may vary if transformers are employed to alter voltages. As noted previously, service system 602 may represent either a single-phase and/or a three-phase system. As a non-limiting example, conductor 606 could be a three-phase conductor network and the service provided to the non-linear load 616 could be single-phase.

Many service variations are possible which may be analyzed for harmonics by embodiments of the ANN source model identifier 600. Accordingly, the ANN source model identifier 600 may be configured to couple to single-phase, two-phase and/or three-phase systems; may be configured to couple to various system voltages; and may even be configured to couple to power supply systems of different operating frequencies (such as, but not limited to, the 60 hertz system commonly employed in the United States, or the 50 hertz system commonly employed in European systems).

Embodiments of the ANN source model identifier 600 are configured to conveniently couple to a service system 602, and/or the non-linear load 616, such that data may be collected to determine harmonic components caused by the non-linear load 616. In FIG. 6, a simplified connector 622 illustrates the ANN source model identifier 600 coupled to the connection interface 618 that provides service to the non-linear load 616 in this simplified example. Greater detail of the various connection aspects of the ANN source model identifier 600 are provided below. However, it is appreciated that the ANN source model identifier 600 could couple to an electric power system at any suitable point.

It is appreciated that the ANN source model identifier 600 determines harmonic contributions from non-linear loads downstream from the connection interface 618. More particularly, the ANN source model identifier 600 determines harmonic contributions from non-linear loads downstream from the potential transformer and current transformer 704 (FIG. 7) which provides the metered voltage information, described in greater detail hereinbelow. Accordingly, depending upon how the ANN source model identifier 600 is connected to the service system 602, loading from one or more customers may be aggregated. For example, in a situation where a customer is billed for harmonic components that the customer injects into the service system 602, the connection interface 618 may be configured to provide metered voltage and current applicable to that specific customer. In another situation, the ANN source model identifier 600 might be coupled to a convenient location on service system 602, such as at a distribution substation, which serves more than one customer.

Figure 7:
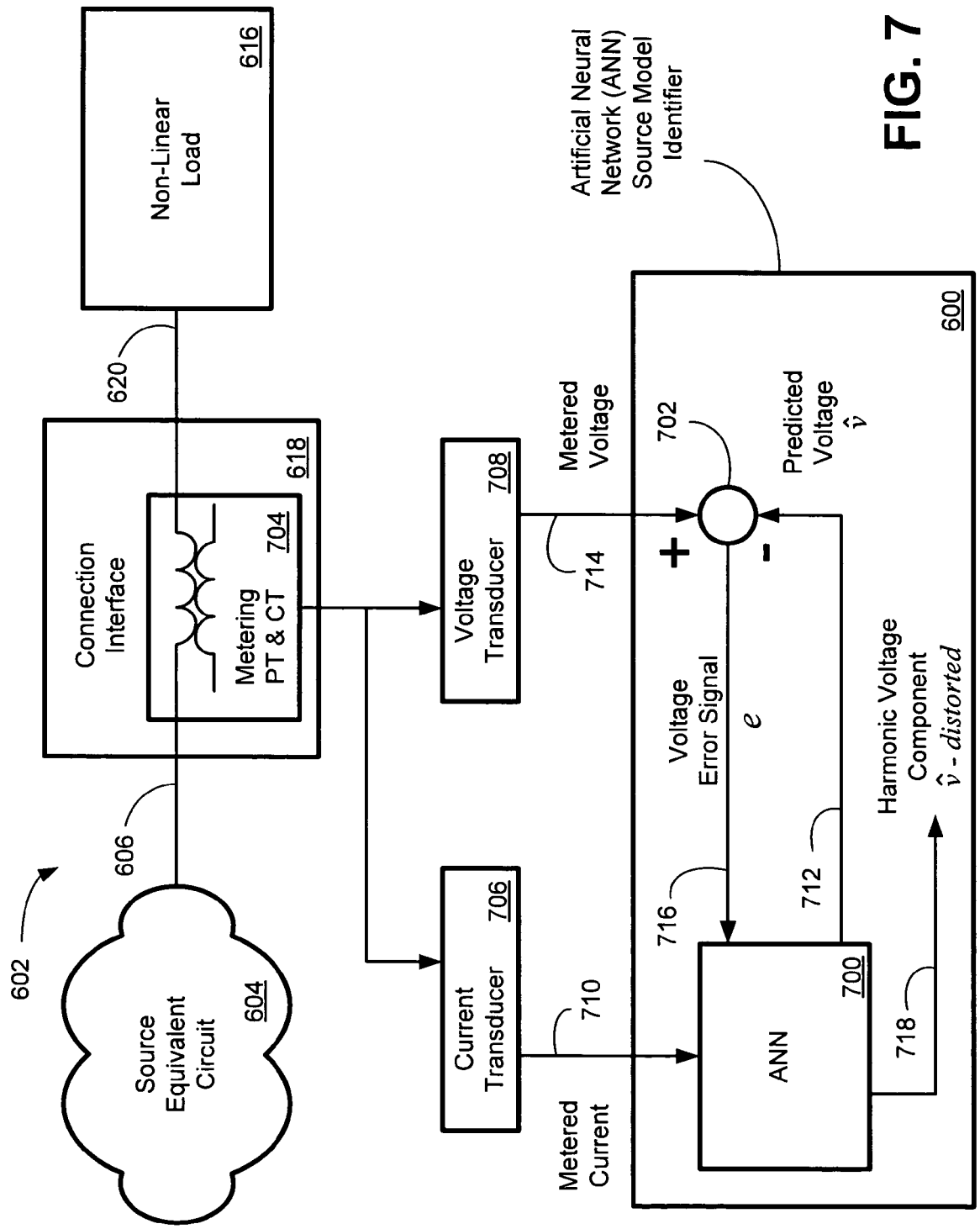
FIG. 7 is a block diagram illustrating in greater detail an embodiment of the ANN source model identifier coupled to the simplified single line diagram of the source equivalent circuit.

FIG. 7 is a block diagram illustrating in greater detail an embodiment of the ANN source model identifier 600 coupled to the simplified single-line diagram of the source equivalent circuit 604. The ANN source model identifier 600 includes an artificial neural network (ANN) 700 and summing circuit 702.

A metering potential transformer (PT) and metering current transformer (CT) 704 are illustrated as residing at the connection interface 618. The PT provides a voltage transformation such that voltage of conductor 606 may be sensed and communicated to voltage transducer 708. The CT provides a current transformation such that current of conductor 606 may be sensed and communicated to current transducer 706. Other voltage and/or current sensing devices may alternatively meter voltage and current, respectively.

Voltage transducer 708 converts the sensed alternating current (AC) voltage into a signal, such as a digitally sampled signal, that is proportional to the sensed AC voltage from the PT. Sensed voltages may be phase-to-phase voltages or phase-to-neutral voltages. Current transducer 706 converts the sensed AC current into a signal, such as a digitally sampled signal, that is proportional to the sensed AC current from the CT.

As noted previously, PTs and CTs are typically available at various points along an electric power system when various other functions associated with operation of the electric power system are performed. Thus, information corresponding to the voltage and information corresponding to the current may be available from already-available devices for some embodiments of the ANN source model identifier 600. In other situations PTs, CTs, voltage transducers 708 and/or current transducers 706 may not be available. Accordingly, other embodiments of the ANN source model identifier 600 may be equipped with such devices, or such devices may be separately installed for the ANN source model identifier 600.

As illustrated in FIG. 7, the ANN 700 receives a signal corresponding to metered current, via connection 710. The ANN 700 is configured to output a predicted voltage $\hat{v}$, via the logical connection 712 (since the predicted voltage $\hat{v}$ is computationally determined by executing software, the ANN logic 908 illustrated in FIG. 9, connection 712 is not a physical connection). The predicted voltage $\hat{v}$ is input into the summing circuit 702 such that the predicted voltage $\hat{v}$ is summed with the signal corresponding to metered voltage, provided on connection 714, such that a difference between the predicted voltage $\hat{v}$, and the metered voltage is determined. The output of the summing circuit 702 (the difference between the predicted voltage $\hat{v}$ and the metered voltage) is the voltage error signal, e, output on the logical connection 716. The voltage error signal e is returned to the ANN 700.

As the voltage error signal e approaches zero, or converges to within a predefined threshold, it is appreciated that the ANN 700 has completed training with respect to predicting voltage. That is, the ANN 700 is accurately predicting voltage metered at connection interface 618, within some predefined threshold.

When predicted voltage $\hat{v}$ is accurately predicted, the ANN 700 may then computationally determine the harmonic voltage component, $\hat{v}$—distorted. Information corresponding to the harmonic voltage component, $\hat{v}$—distorted, is output on connection 718, and may be used for a variety of purposes, as is well understood in the arts.

Figure 8:
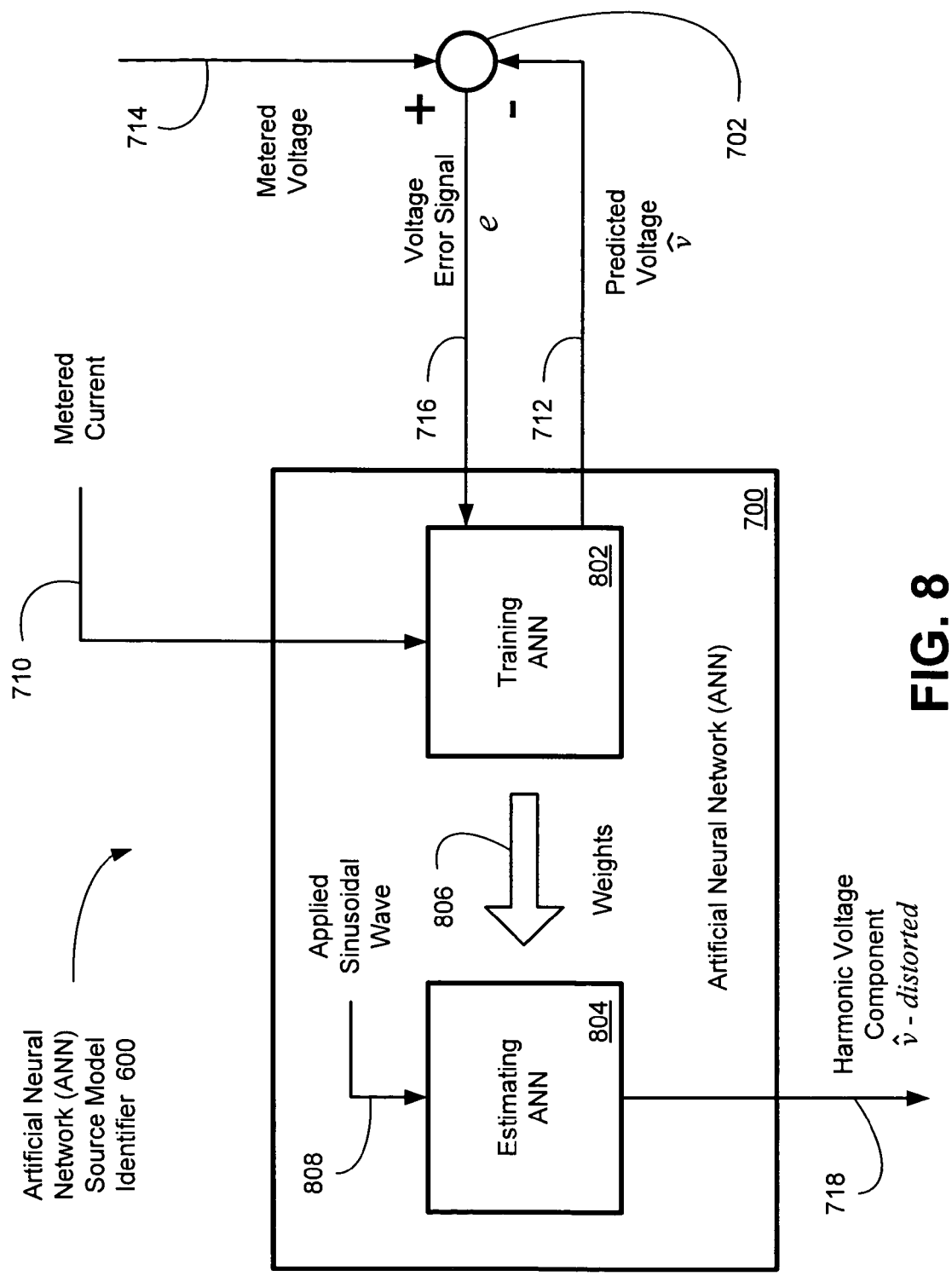
FIG. 8 is a conceptual block diagram illustrating an embodiment of the ANN source model identifier.

FIG. 8 is a conceptual block diagram illustrating an embodiment of the ANN source model identifier 600. The ANN 700 (see also FIG. 7), in this embodiment, includes two artificial neural networks, the training ANN 802 and the estimating ANN 804. It is appreciated that the training ANN 802, the estimating ANN 804 and the summing circuit 802 may be implemented as software, firmware, or combinations of software and firmware.

In this conceptual embodiment, the training ANN 802 receives the signal corresponding to metered current, via connection 710. At the end of a training time, or sampling interval, the training ANN 802 outputs the predicted voltage $\hat{v}$, via connection 712, to the summing circuit 702. Metered voltage is then summed with the predicted voltage $\hat{v}$ (such that a difference between the predicted voltage $\hat{v}$ and the metered voltage is determined). In one embodiment, the voltage at the end of the sampling interval is used for the comparison. (In other embodiments, the metered voltage used for training may be used when this information is stored for later retrieval.)

The voltage error signal e is returned on connection 716 to the training ANN 802. As noted above, when the voltage error signal e approaches zero, or converges, the training ANN 802 has completed training with respect to predicting voltage. In some embodiments, the voltage error signal e has converged when the difference between the predicted voltage $\hat{v}$ and the metered voltage is less than and/or equal to a predefined threshold.

The metered voltage may be considered as a pure sinusoidal wave provided by the source equivalent circuit 604 with harmonic components injected thereon by the non-linear load 616 (FIGS. 6 and 7). Thus, the corresponding predicted voltage $\hat{v}$ is a computed sinusoidal wave voltage distorted by the harmonics. The computed predicted voltage $\hat{v}$ may be represented by any suitable mathematical equation or algorithm, which is selected based upon the design of the particular embodiment of the ANN source model identifier 600.

In one embodiment, the source equivalent circuit 604 impedance is modeled. Accordingly, the impedance of the source equivalent circuit 604 is modeled by a suitable equation with determined weights. In another embodiment, weights associated with the equation defining the predicted voltage $\hat{v}$ are determined. After the weights have been determined by the training ANN 802, the weights are communicated to the estimating ANN 804 (represented conceptually by the directional arrow 806).

While the estimating ANN 804 determines the harmonic voltage component ($\hat{v}$—distorted), the training ANN 802 in one embodiment continues sampling. Weights are adjusted at each sample depending on the degree of convergence (the difference between the predicted voltage $\hat{v}$ and the metered voltage). When the estimating ANN 804 has determined the harmonic voltage component ($\hat{v}$—distorted), the estimating ANN 804 receives another set of weights from the training ANN 802. In one embodiment, the received second set of weights are the most current value of the weights determined by the training ANN 802. Then, the estimating ANN 804 determines another harmonic voltage component based upon the new weights. The above-described process may be continuously repeated.

Depending upon the embodiment, the training ANN 804 may then restart the training process to predict another predicted voltage $\hat{v}$. Thus, after some period of time, weights associated with the subsequent predicted voltage $\hat{v}$ are determined. The newly determined weights may or may not equal the previously determined weights, depending upon whether the nature of the non-linear load 616 and/or the power supply have changed by the time the second training period has been completed. That is, if the degree of convergence has changed since the previous sampling period, newly computed weights will be different. For example, a customer may have turned on (or off) a solid-state load, thereby changing the nature of the non-linear load 616, thereby resulting in a change in the degree of convergence. Accordingly, the training and determining harmonic components may be performed on a continual basis.

The estimating ANN 804 receives the determined weights (for the source equivalent circuit 604 impedance and/or predicted voltage $\hat{v}$ equation). The estimating ANN 804 then computationally applies the weights to a pure sinusoidal wave 808. Distortion in the output of the sinusoidal wave (distorted by the determined weights) is then used to determine the harmonic voltage component ($\hat{v}$—distorted) associated with the source equivalent circuit 604.

Information corresponding to the harmonic voltage component ($\hat{v}$—distorted) and/or a determined impedance associated with the source equivalent circuit 604 may then be communicated through connection interface 718, and may be used for a variety of purposes, as is well understood in the arts.

Figure 9:
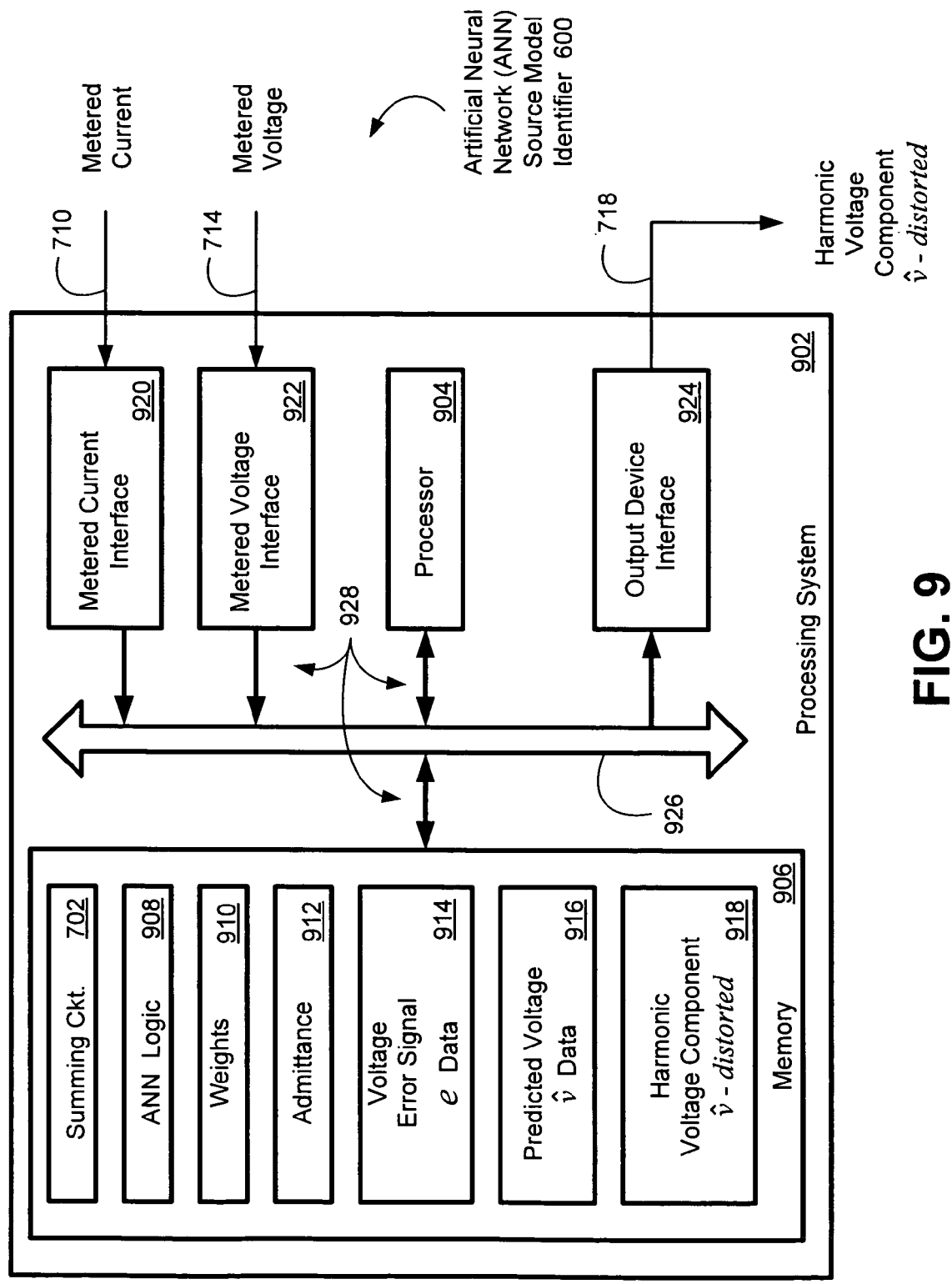
FIG. 9 is a block diagram illustrating in greater detail an exemplary embodiment of an ANN model source identifier.

FIG. 9 is a block diagram illustrating in greater detail an exemplary embodiment of an ANN source model identifier 600. The exemplary embodiment comprises a processing system 902 and summing circuit 702. Processing system 902 includes a processor 904 and memory 906. In one embodiment, memory 906 includes regions for storing the summing circuit 702 (implemented as logic), artificial neural network (ANN) logic 908, the above-described weights 910 and admittance 912, data corresponding to the voltage error signal e 914, the predicted voltage $\hat{v}$ 916, and/or the harmonic voltage component ($\hat{v}$—distorted) 918, depending upon the particular embodiment. The information is saved into memory 906 for ongoing processing, and/or may be saved for later processing and/or analysis. In other embodiments, the information may be saved in other memories as needed, such as buffers or random access memories.

Also included are suitable interfaces that provide coupling to the above-described connections which communicate the various information. The metered current interface 920 provides coupling to connection 710 such that information corresponding to the metered current is received. The metered voltage interface 922 provides coupling to connection 714 such that information corresponding to the metered voltage is received. The output device interface 924 provides coupling to connection 718 such that information corresponding to the harmonic voltage component ($\hat{v}$—distorted) is transmitted to a suitable device.

The above described components are communicatively coupled to each other via bus 926 and connections 928. In alternative embodiments of processing system 902, the above-described components are connectively coupled to processor 904 in a different manner than illustrated in FIG. 9. For example, one or more of the above-described components may be directly coupled to processor 904 or may be coupled to processor 904 via intermediary components (not shown).

The above-described interfaces 920, 922 and/or 924 may be passive devices, or they may be active devices that process the received/transmitted signals into a suitable format. For example, the metered current interface 920 may be a simple coupling to connection 710 when the current transducer 706 (FIG. 7) provides a suitable metered current signal that may be directly communicated onto bus 928 such that information corresponding to metered current is received by processor 904. In another embodiment, the metered current interface 920 processes the metered current information received on connection 710 into a suitable signal that is directly communicated onto bus 928. As another example, the output device interface 926 may communicate information corresponding to the harmonic voltage component ($\hat{v}$—distorted) to a display such that a voltage or current signal is displayed to a viewer. Or, output device interface 926 may communicate information corresponding to the harmonic voltage component ($\hat{v}$—distorted) to another processing system or memory for future analysis.

In various embodiments, the summing circuit 702 could be implemented as software (with its own processor and memory, not shown), as firmware, or as a combination of firmware and software. In another embodiment, an interface (not shown) to receive the metered voltage information on connection 714 is included such that the processor 904 computationally determines the voltage error signal e. In this embodiment, the interfaces 922 and 924 are omitted.

Figure 10:
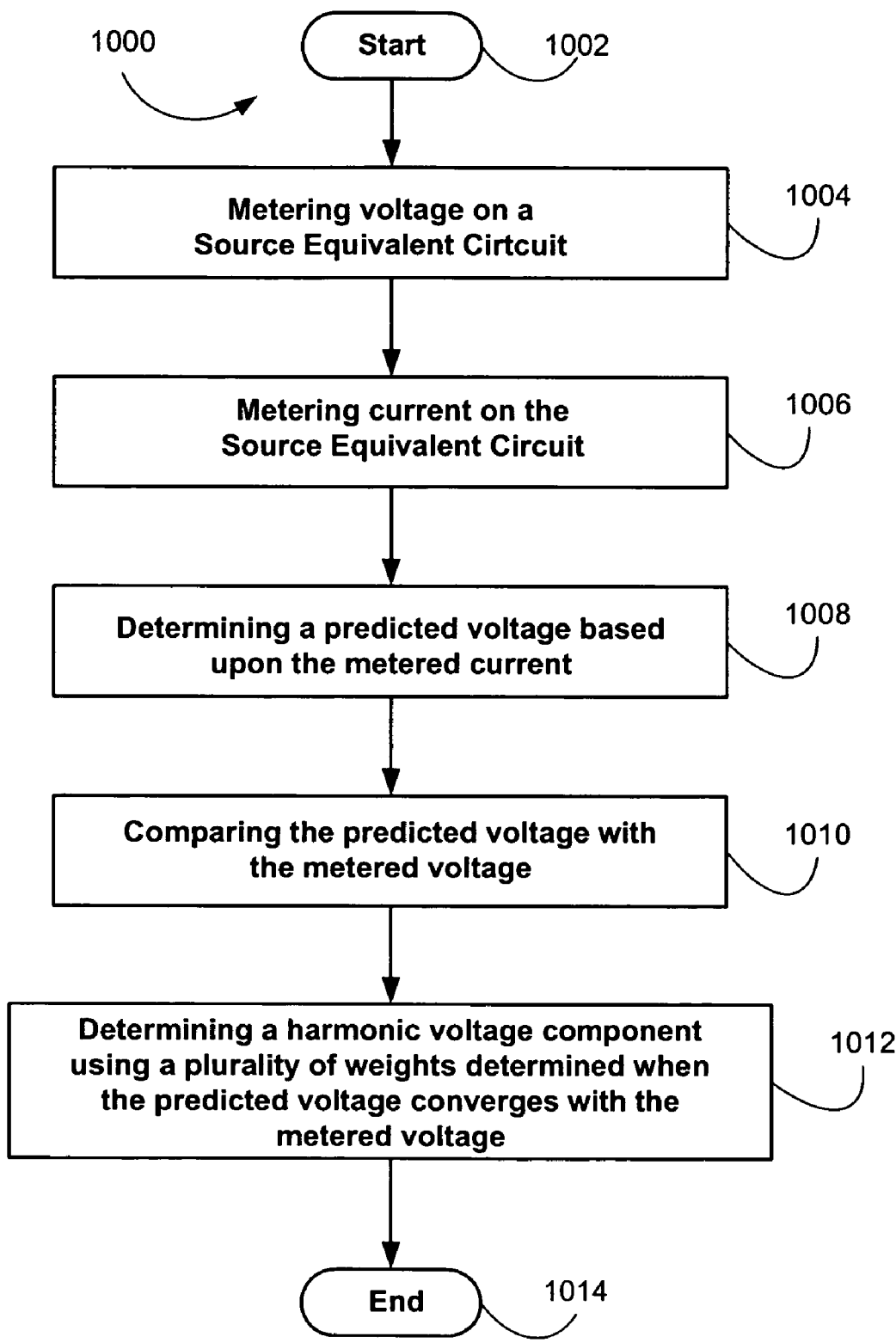
FIG. 10 is a flow chart illustrating an embodiment of a process for determining harmonic components using an embodiment of the ANN source model identifier.

FIG. 10 shows a flow chart 1000 illustrating a process used by an embodiment of ANN source model identifier 600 (FIG. 6-FIG. 9). The flow chart 1000 of FIG. 10 shows the architecture, functionality and operation of an embodiment for implementing the ANN logic 908 (FIG. 9). An alternative embodiment implements the logic of flow chart 1000 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 10, or may include additional functions. For example, two blocks shown in succession in FIG. 10 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 1002. At block 1004, voltage on a source equivalent circuit is metered. At block 1006, current on the source equivalent circuit is metered. At block 1008, a predicted voltage based upon the metered current is determined. At block 1010, the predicted voltage is compared with the metered voltage. At block 1012, a harmonic voltage component is determined using at least one weight determined when the predicted voltage converges with the metered voltage. The process ends at block 1014.

Embodiments of the ANN logic 408, and the above-described information, implemented in memory 406 (FIG. 4) and/or the ANN logic 908, and the above-described information implemented in memory 906 (FIG. 9) may be implemented using any suitable computer-readable medium. In the context of this specification, a "computer-readable medium" can be any means that can store or communicate the data associated with, used by or in connection with the instruction execution system, apparatus, and/or device. The computer-readable medium can be, for example, but not limited to, an electronic, magnetic, optical, electromagnetic, infrared, or semiconductor system, apparatus, or device now known or later developed.

Processing system 402 and/or processing system 902 are typically a commercially available processor. Examples of commercially available processors include, but are not limited to, a Pentium microprocessor from Intel Corporation, Power PC microprocessor, SPARC processor, PA-RISC processor or 68000 series microprocessor. Many other suitable processors are also available. Or, processing system 402 may be a specially designed and fabricated processor in accordance with embodiments of the ANN non-linear load analyzer 100. Similarly, processing system 902 could be a specially designed and fabricated processor in accordance with embodiments of the ANN source model identifier 600.

It should be emphasized that the above-described embodiments are merely examples of the disclosed system and method. Many variations and modifications may be made to the above-described embodiments. All such modifications and variations are intended to be included herein within the scope of this disclosure.

What is claimed is:

1. A method for determining harmonics caused by non-linear loads, comprising:
   metering voltage on an electric power system;
   metering current on the electric power system;
   determining a predicted voltage based upon the metered current;
   comparing the predicted voltage with the metered voltage;
   determining a plurality of weights when the predicted voltage converges within a predetermined threshold of the metered voltage;
   determining a harmonic voltage component by computationally combining a sinusoidal waveform with the plurality of weights; and
   communicating the determined weights to an estimating artificial neural network when the predicted voltage converges with the metered voltage.

2. The method of claim 1, further comprising determining when the predicted voltage converges with the metered voltage by comparing the predicted voltage with the metered voltage.

3. The method of claim 1, further comprising:
   metering single-phase voltage; and
   metering single-phase current.

4. The method of claim 1, further comprising:
   metering three-phase voltage; and
   metering three-phase current.

5. The method of claim 1, further comprising:
   again determining predicted voltage based upon the metered current;
   again comparing the predicted voltage with metered voltage;
   determining another plurality of weights; and
   determining a second harmonic voltage component using the other plurality of weights.

6. A system that determines harmonics caused by non-linear loads, comprising:
   an artificial neural network configured to receive information corresponding to metered current, to train itself such that a predicted voltage determined from the information corresponding to metered current converges with a metered voltage, and to determine a harmonic voltage component using a plurality of weights determined when the predicted voltage converges with the metered voltage wherein a sinusoidal wave is computationally combined with the plurality of determined weights to determine the harmonic voltage component; a summing circuit that compares the determined predicted voltage and the metered voltage, and that outputs a voltage error to the artificial neural network such that when the voltage error is less than a predefined threshold, the artificial neural network determines the predicted voltage converges with the metered voltage; and
   a processor configured to execute the artificial neural network.

7. The system of claim 6, wherein the determined predicted voltage converges with the metered voltage within a predefined threshold.

8. The system of claim 6, further comprising a memory wherein the artificial neural network resides.

9. The system of claim 6, wherein the voltage error corresponds to a difference between the metered voltage and the predicted voltage.

10. The system of claim 6, further comprising a voltage transducer that receives a signal corresponding to voltage from a potential transformer, and that outputs a second signal corresponding to the metered voltage, the second signal communicated to the summing circuit as the metered voltage.

11. The system of claim 6, further comprising a current transducer that receives a signal corresponding to current from a current transformer, and that outputs a second signal corresponding to the metered current, the second signal communicated to the artificial neural network as the metered current.

12. The system of claim 6, wherein the artificial neural network further comprises:
   a training artificial neural network that determines the predicted voltage from the information corresponding to metered current and that determines the plurality of weights determined when the predicted voltage converges with the metered voltage; and
   a separate estimating artificial neural network that determines the harmonic voltage component using the plurality of determined weights received from the training artificial neural network.

13. A system for determining harmonics caused by non-linear loads, comprising:
   means for receiving metered voltage from an electric power system;
   means for receiving metered current from the electric power system;
   means for determining a predicted voltage based upon the metered current;
   means for comparing the predicted voltage with the metered voltage;
   means for determining when the predicted voltage converges with the metered voltage by comparing the predicted voltage with the metered voltage; means for determining a plurality of weights when the predicted voltage converges with the metered voltage; and
   means for determining a harmonic voltage component using the plurality of determined weights, where a sinusoidal wave is computationally combined with the plurality of determined weights to determine the harmonic component.

14. The system of claim 13, wherein the means for determining when the predicted voltage converges with the metered voltage comprises means for comparing a difference between the predicted voltage and the metered voltage to a predefined threshold.

15. The system of claim 13, further comprising:
   means for metering single-phase voltage; and
   means for metering single-phase current.

16. The system of claim 13, further comprising:
   means for metering three-phase voltage; and
   means for metering three-phase current.

17. A computer-readable medium embodying a program executable by a processor circuit for determining harmonics caused by non-linear loads, the program comprising:
   logic configured to receive information corresponding to a metered current from an electric power system;
   logic configured to receive information corresponding to a metered voltage on the electric power system;
   logic configured to determine a predicted voltage based upon the metered current;
   logic configured to determine when the predicted voltage converges with the metered voltage by comparing the predicted voltage with the metered voltage; logic configured to determine a plurality of weights when the predicted voltage converges with the metered voltage; and
   logic configured to determine a harmonic voltage component using the plurality of determined weights, where a sinusoidal wave is computationally combined with the plurality of determined weights to determine the harmonic component.

18. The computer-readable medium of claim 17, further comprising logic configured to compare a difference between the predicted voltage and the metered voltage to a predefined threshold.

19. An artificial neural network that determines harmonics caused by non-linear loads, comprising:
   a training artificial neural network that determines a predicted voltage from a metered current, and that determines a plurality of weights when the predicted voltage converges with a metered voltage when a voltage error is less than a predefined threshold; a comparison circuit that compares the determined predicted voltage and the metered voltage and outputs the voltage error to the training artificial neural network; and
   a separate estimating artificial neural network that determines a harmonic voltage component using the determined weights received from the training artificial neural network.

20. The artificial neural network of claim 19, wherein the training artificial neural network trains itself such that the predicted voltage is determined which converges with the metered voltage.

21. The artificial neural network of claim 20, wherein the training artificial neural network compares the predicted voltage with the metered voltage to determine when the predicted voltage converges with the metered voltage.

* * * * *

UNITED STATES PATENT AND TRADEMARK OFFICE
CERTIFICATE OF CORRECTION

PATENT NO. : 7,720,620 B2  Page 1 of 1
APPLICATION NO. : 11/337630
DATED : May 18, 2010
INVENTOR(S) : Ronald G. Harley et al.

It is certified that error appears in the above-identified patent and that said Letters Patent is hereby corrected as shown below:

At column 1, line 9, delete "continuation-in-pad" and replace with --continuation-in-part--.

At column 7, line 63, delete "above-described components are connectivley coupled to" and replace with --above-described components are connectively coupled to--.

At column 8, lines 7 and 12, delete "bus 428" and replace with --bus 426--.

At column 8, lines 13 and 16, delete "interface 426" and replace with --interface 424--.

At column 11, line 1, delete "summing circuit 802" and replace with --summing circuit 702--.

At column 12, lines 59 and 64, delete "bus 928" and replace with --bus 926--.

At column 12, line 65 and column 13, line 1, delete "interface 926" and replace with --interface 924--.

Signed and Sealed this

Thirteenth Day of July, 2010

David J. Kappos
*Director of the United States Patent and Trademark Office*